Inventor
JOHN PERCIVAL WATSON
By Haseltine Lake & Co.
Agents

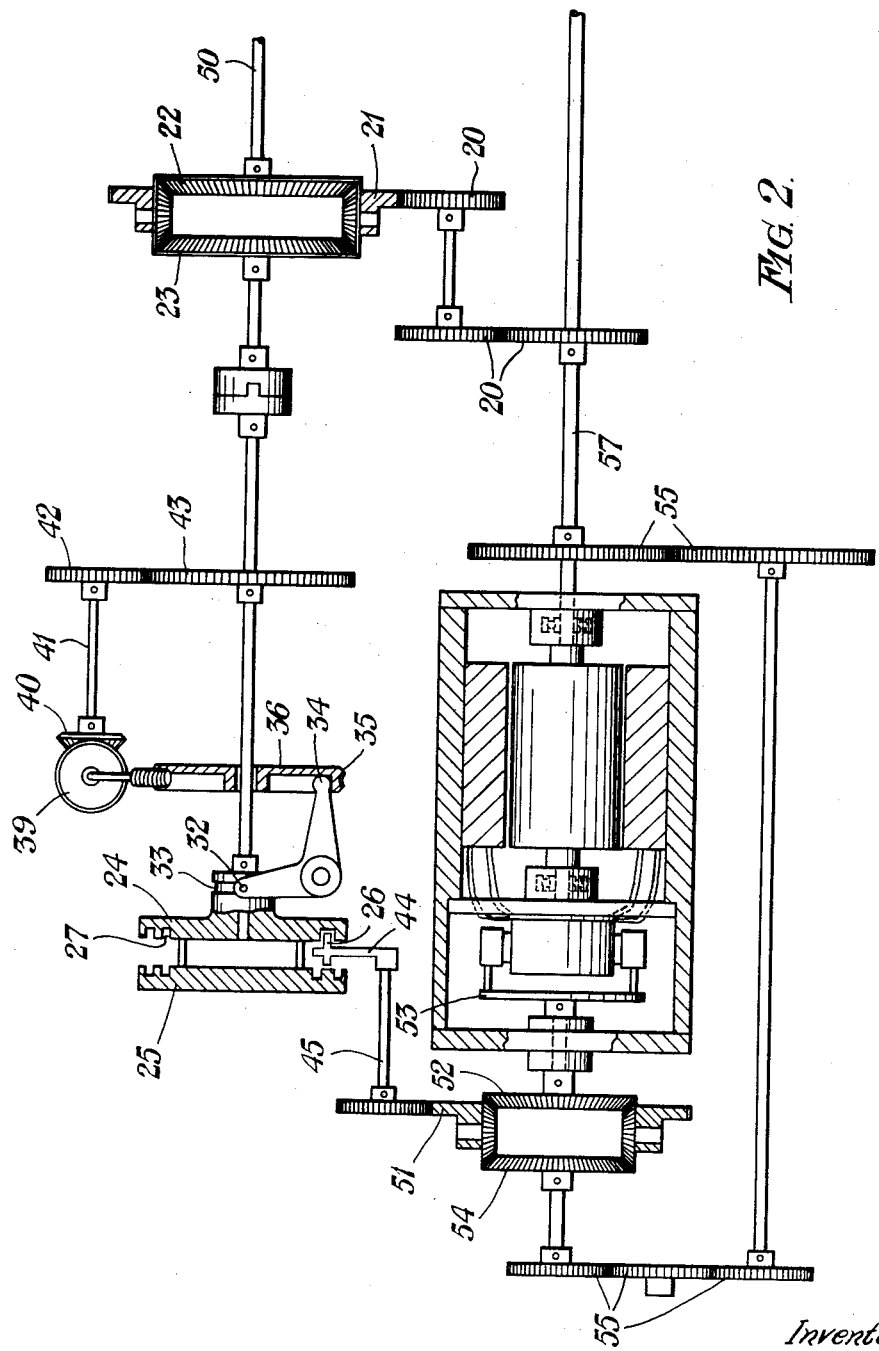

Nov. 14, 1950 J. P. WATSON 2,529,669
POWER FOLLOW-UP SYSTEM OR REMOTE CONTROL SYSTEM
Filed Feb. 26, 1947 3 Sheets-Sheet 3
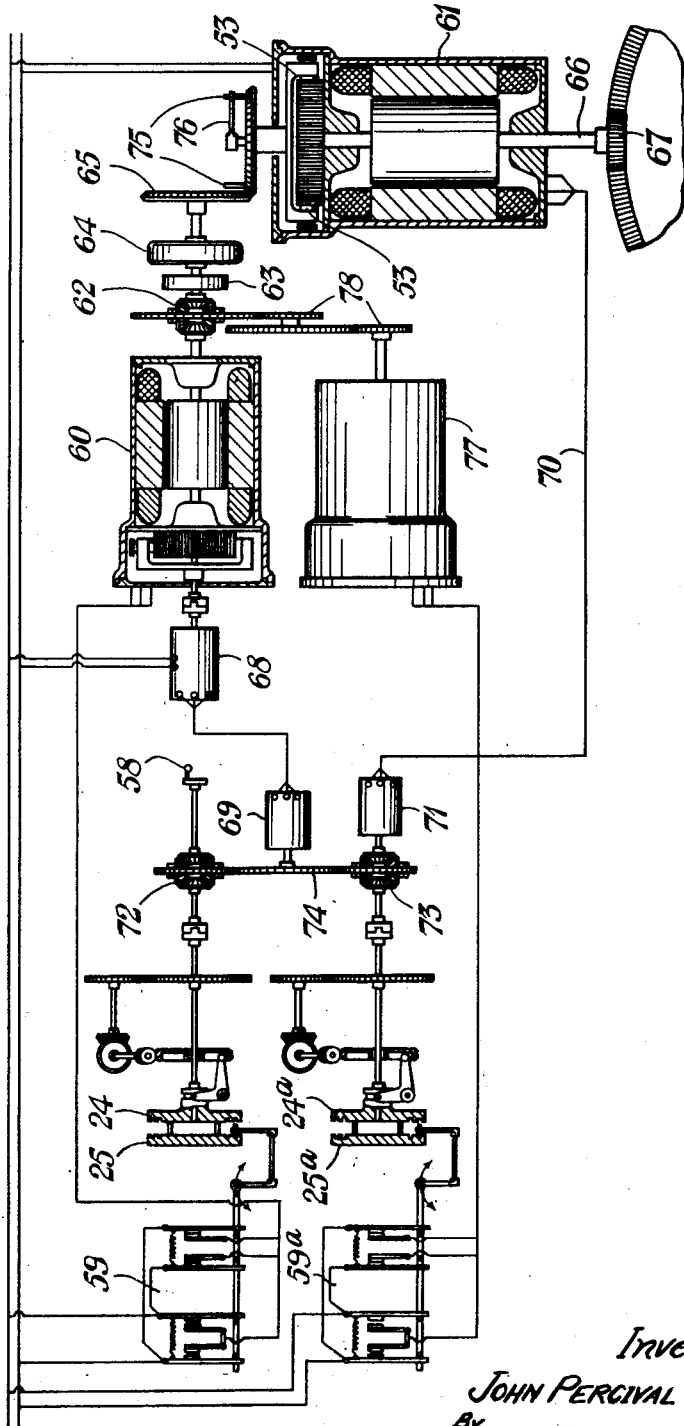
Inventor
JOHN PERCIVAL WATSON
By Haseltine, Lake & Co.
Agents Patented Nov. 14, 1950

2,529,669

UNITED STATES PATENT OFFICE 2,529,669

POWER FOLLOW-UP SYSTEM OR REMOTE CONTROL SYSTEM

John Percival Watson, Westminster, London, England, assignor to Vickers-Armstrongs Limited, London, England, a company of Great Britain Application February 26, 1947, Serial No. 731,107 In Great Britain July 19, 1939

Section 1, Public Law 690, August 8, 1946 Patent expires July 19, 1959

8 Claims. (Cl. 318—32)

This invention relates to power follow-up systems or remote control systems of the kind in which a hunting principle is employed for the resetting of the sensitive input control element, and may be used for the purpose of operating a gun, searchlight or the like in synchronism with a director, forming the sensitive input control.

In the specification of our prior Patent No. 2,170,623, there is described a hunter power follow-up apparatus in which a step-by-step transmitter and receiver are brought out of alignment with the aid of a differential gear, one side member of which is connected to the step-by-step transmitter and the other side member to the step-by-step receiver, so that the centre member of the differential gear is effectively a sensitive control element, the latter being, in turn, controlled by hunter apparatus for resetting.

It is the aim of the present invention to apply the principle of differentially off-setting an electrical system so as to obtain similar results.

A power follow-up system or remote control system of the kind referred to in accordance with the invention comprises an electric motor and electrical and/or mechanical means interposed between the sensitive input control element and said motor adapted on operation of said control element to offset in an electrical or mechanical sense, the supply brushes relatively to the commutator supplying the field winding so that the effective resultant field of the field winding will be displaced to cause angular displacement of the motor armature in sympathy with the field, the system also including a hunter mechanism comprising a return mechanical or electromechanical connection from said armature to said control element in which is interposed a device for off-setting the control element and a device for storing up movement to allow the system to function as a hunter power follow-up or as a remote transmission apparatus. In stating above that the brushes are displaced relatively to the commutator, this expression is intended to cover mechanical or electrical displacement and in the latter case it will be appreciated that the brushes need not actually be moved to effect an equivalent electrical displacement thereof.

In order that the invention may be more clearly understood and readily carried into effect, reference will now be made to the accompanying drawings, wherein:

Figure 2 is a view illustrating diagrammatically a modified arrangement; and

Figure 3 is a diagrammatic illustration of a self-aligning power transmission system incorporating the invention.

Figure 1:
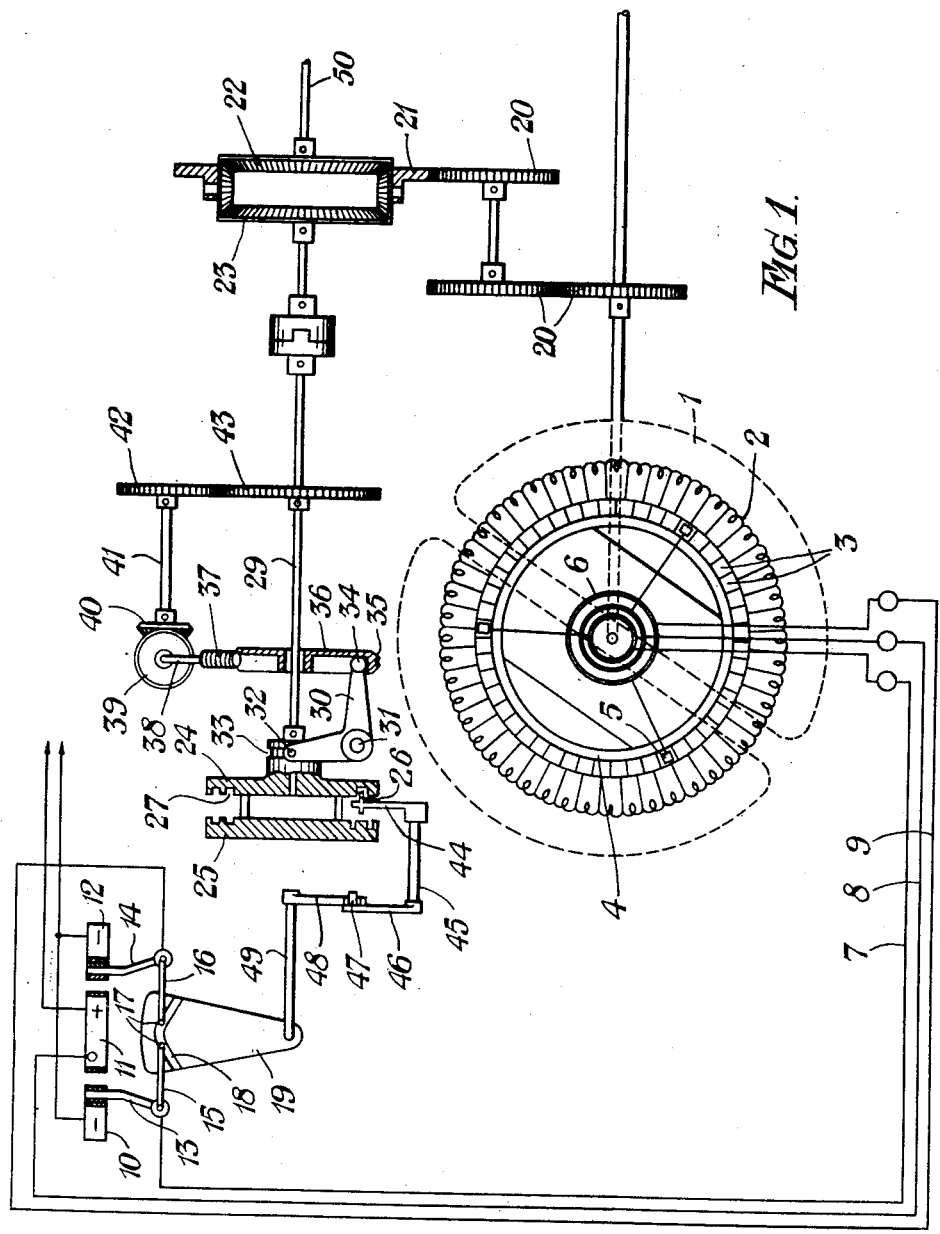
Figure 1 illustrates diagrammatically a power follow-up system constructed and arranged in accordance with the invention.

Referring in the first instance to Figure 1 of the accompanying drawings, an electric motor 1 is employed which essentially has a field winding 2 of continuous form connected at regular tapping points to the segments 3 of a stationary commutator 4. Three brushes 5 are disposed so as to contact with the commutator at angular intervals of 120°, the brushes being supported by a brush cage secured to the rotor shaft of the motor. The rotor is unwound comprising laminations arranged to afford an inductor rotor having two poles so that such rotor may set itself in the field produced by the stator winding. Slip rings 6 are arranged in association with the brushes 5 so as to permit three input leads 7, 8 and 9, to be connected via the slip rings 6 to the brushes. The input leads are connected also with a switch device and are supplied with single-phase alternating current or direct current. If it is supposed that direct current is employed, then the switch device comprises three stationary contacts 10, 11 and 12, arranged side-by-side and connected with the supply so that the centre one 11 is of one polarity and the outer pair 10 and 12 are both of opposite polarity. There are two displaceable contact arms 13 and 14 connected respectively with the input leads 7 and 9, the third input lead 8 to the motor being connected to the stationary contact 11. The contact 11 and contacts 10 and 12 are also connected by suitable leads with the source of current supply. The control levers 15 and 16 which are rigidly associated respectively with contact arms 13 and 14 each have a pin 17 engaging in a cam slot 18 of a cam sector 19. By suitable design of the cam sector 19 in relation to the position of the contact arms with their control levers an arrangement is afforded whereby the cam sector may occupy a central or zero position where both the contact arms engage the outer stationary contacts 10 and 12, the switch being illustrated in this centre or zero position. By displacing the cam sector 19 in, say, a clockwise direction from the zero position thereof the displaceable arms may be brought to two alternative positions in the first of which one of the arms is not in co-operation with any fixed contact and the other arm is engaged with an outer stationary contact, and in the second position the first arm engages the central stationary contact whilst the other arm continues to engage the outer stationary contact. By displacing the cam sector in an anti-clockwise direction from the zero position thereof the displaced arms may be brought to two alternative positions, as in the clockwise direction, but in this instance when in the first position, one of the arms engages the outer contact whilst the other arm does not co-operate with any fixed contact, and in the second position the first arm continues to engage the outer contact whilst the other arm engages the centre contact. It will be observed that the two positions of the arms when the cam sector is worked in clockwise or anti-clockwise direction are similar, but they are opposite so that proceeding from the zero position, two different modes of connection of the three input leads of the motor may be achieved in either direction of movement from such zero position.

The armature or rotor of the motor is connected through gearing 20 to the centre member 21 of a differential gear, one side element 22 of which constitutes the sensitive input to the system the gearing and differential thereby forming a return mechanical connection between the armature and sensitive input, this return mechanical connection forming hunting mechanism. The other side member 23 drives into a wrap-up mechanism which controls the cam sector 19 of the switch device above described. The wrap-up cam mechanism is of the kind described and illustrated in the specification and drawings of our British Patent No. 586,106, and essentially comprises two discs 24 and 25, the one 24 having a continuous cam groove 27 consisting of two substantially concentric circular portions arranged one within the other and connected by a canted or inclined portion, whilst the other disc has two complete circular grooves, there being a pin 26 adapted to co-operate with the one disc or the other according to the motion which is to be wrapped-up in the cam mechanism. As set forth in the specification of the British patent above referred to, means are arranged for displacing the discs axially during a wrapping-up action, when it is desired that the pin should enter one of the continuous circular grooves, but otherwise the pin engages the continuous cam groove and normally rests in a zero position upon the canted or inclined part thereof.

In the arrangement shown, the discs 24 and 25 are moved axially on a shaft 29 by means of a bell crank lever 30 pivoted at 31 and having a pin 32 which engages in a groove 33 in a member forming part of the disc 24, the extremity 34 of the bell crank lever 30, being engaged by a cam surface 35 formed on the interior surface of a worm wheel 36 which is rotated by means of a worm 37 carried by a shaft 38 to which is attached a bevel pinion 39 meshing with a further bevel pinion 40 carried by a shaft 41, the latter carrying a gear wheel 42 meshing with a gear wheel 43 attached to the shaft 29.

Rocking movements of the pin 26 under the action of the cam groove 27 in the disc 24 causes the arm 44 to turn about the axis of the shaft 45, the latter carrying a further arm 46 having a projecting pin 47 co-operating with an arm 48 associated with the shaft 49 to which the cam sector 19 is attached.

It will be understood that when the sensitive input spindle 50 of the system is operated and the cam sector 19 displaced under the action of the cam disc 24 and the pin 26, that is to say through the medium of the wrap-up mechanism, then the configuration of the electrical supply to the three brushes of the motor will be altered, with the result that the field thereof will be displaced. The displacement of the field must result in the following of the rotor of the motor with the result that through the differential gear described, the cam sector is re-set to its initial position. The rotor cannot fall out of step with the field which controls it, so that it will have a natural acceleration depending upon the inertia of the object which may be driven from the output shaft of the apparatus, that is to say, the power output shaft of the motor.

In the above described example, the brushes are displaceable in the electrical sense and not in the mechanical sense. The invention is now described with reference to Figure 2 wherein an arrangement is shown in which an actual mechanical displacement of the brushes is effected. In this case, the arrangement is substantially as before and consequently similar reference numerals have been used to indicate the similar parts. In this case the output movement from the wrap-up mechanism is applied to the centre member 51 of a differential gear the one side member 52 of which is mechanically connected with the brush carrying member 53. The other side member 54 of the differential gear is connected by means of gearing 55 with the output shaft 57 of the motor and the brushes are not otherwise mechanically in connection therewith. It will be appreciated that the output of the wrap-up mechanism when applied to the centre member 51 of the differential gear will cause the brushes to be offset and as a result the rotor will move and tend to regain zero setting in the sense that it will tend to lie in the field produced by the stator, but such movement of the rotor will be communicated back to the side of the differential gear connected with the rotor shaft and as a result continuous running will follow until the centre member of the differential gear is restored to its initial position. Such restoring is effected through wrap-up mechanism employing the offset cam previously described in connection with Figure 1.

The invention may be applied to a remote control system since equi-distant tappings from the stator winding may be connected to a synchronous motor or motors remotely arranged, such synchronous motor or motors serving to recentre the control element in the mechanism whether it be a differential gear or the switch device indicated. The synchronous motor or motors will reproduce the movement of the field in the main, or transmitter motor and will, therefore, run in synchronism and alignment therewith.

Figure 3 of the accompanying drawings illustrates diagrammatically a self-aligning power transmission system operated on alternating current supply intended primarily for operating a gun, searchlight, or the like in synchronism with a director which forms a sensitive input.

In the arrangement shown, assuming the gun or the like is already lined up with its director, when the sensitive input handle 58 at the director is displaced, the cam mechanism 24 and 25 is also displaced through the medium of the geared connection and its associated mechanism illustrated by Figs. 1 and 2 which alters the switching arrangement of the control switch 59 which corresponds with that shown in Fig. 1, causing the field of the auxiliary motor 60 to be displaced relative to its brushes so that this motor will rotate so long as the field is displaced. The auxiliary motor 60 drives the brushes 53 of the torque amplifier motor 61 through the differential generally indicated by reference numeral 62, a slipping clutch 63, a flywheel 64, and gears 65. When the brushes 53 have been displaced through an angle corresponding to the torque required of the torque amplifier motor 61, the output shaft 66 of the latter will begin to rotate and drive the gun or the like through the medium of gearing 67 and will continue to rotate so long as the brushes 53 are rotated.

Coupled to the shaft of the auxiliary motor 60 is a transmitter 68 which operates the receiver motor 69 in synchronism with the auxiliary motor 60. The stator of the torque amplifier motor 61 has three equi-distant tappings which are connected by cables 70 to the synchronous motor 71.

The synchronous motor 71 rotates in synchronism with the torque amplifier motor 61. Between the sensitive input handle 58 and the cam mechanism 24, 25 is a differential indicated generally by reference numeral 72, the centre member of which is connected to the centre member of a second differential gear 73 by a spur wheel 74 attached to the shaft of the receiver motor 69. The differential 73 can be recentred mechanically or electrically, the electrical method being the one described.

During normal operation of the sensitive input 58, motors 60, 61, 69 and 71 will rotate at the same speed so that the cam mechanism 24a and 25a and control switch 59a remain in the neutral position.

On bringing the sensitive input hand wheel 58 to rest, the auxiliary motor 60, by means of the transmitter 68, receiver motor 69 and differential 72 restores the cam mechanism 24 and 25 to its neutral position.

If the sensitive input 58 is driven at a speed greater than the speed at which the torque amplifier motor 61 can rotate, then the auxiliary motor 60 will drive the brushes 53 until the studs 75 come into contact with the arm 76, which is keyed to the torque amplifier motor shaft 66, thus the auxiliary motor 60 would tend to drive the motor 61. The resistance offered causes slipping between the shaft of the auxiliary motor 60 and gear wheels 65.

Alignment has now been lost between the sensitive input 58 at the director and the gun due to the torque amplifier motor 61 making less revolutions than the auxiliary motor 60. Thus the synchronous motor 71 has made a smaller number of revolutions than the receiver motor 69 with the result that the cam mechanism 24a and 25a is displaced and the switch 59a is operated, thus causing the operation of the tuning motor 77 which drives or tends to drive the brushes 53 through the medium of gearing 78, the differential 62, clutch 63 and gear wheels 65.

Any out of alignment between the director and the gun is thus registered on the cam mechanism 24a and 25a. As the speed of the sensitive input handle 58 approaches normal conditions, the tuning motor 77 becomes effective and drives the brushes 53 in the appropriate direction until alignment is restored. During the operations just considered the cam mechanism 24 and 25 would recentre first and the auxiliary motor 60 would be suddenly stopped. The flywheel 64 would continue to drive the brushes 53 which, together with the speed of the tuning motor, would control the deceleration of the torque amplifier motor 61.

Should the director be displaced when the current is switched off the system, then when the current is switched on the gear would automatically bring the gun into alignment with the director. Assuming that the current has been switched off and the director moved into a new position, the sensitive input 58 operates the cam mechanism 24 and 25 which registers the angular movement of the member 58 since the whole of the motor mechanism is inoperative. When the current is switched on, the auxiliary motor 60 will accelerate to full speed, but due to the considerations dealt with above, slip will occur between the auxiliary motor 60 and the torque amplifier motor 61, with the result that the difference in angular displacement between the auxiliary motor 60 and the torque amplifier motor 61 will be registered on the cam mechanism 24a and 25a. As stated above, the auxiliary motor 60 would recentre the cam mechanism 24 and 25 first and the auxiliary motor 60 would be suddenly brought to rest, but the flywheel 64 and tuning motor 77 would continue to operate the torque amplifier motor 61 until self-alignment had been effected. The flywheel 64 and tuning motor 77 control the deceleration of the torque amplifier motor 61. The three motors 60, 61 and 77 are similar in construction.

I claim:

1. A power follow-up system comprising a motor having a stator field winding, a commutator, connections between consecutive segments of the commutator and consecutive tappings of said field winding, a rotor formed as an inductor rotor, a rotational brush system for co-operation with said commutator, a sensitive input shaft, and further comprising a first differential gear with one side member connected to said input shaft, an output shaft driven from said rotor, a connection between said output shaft and the center member of said first differential gear, a second differential gear with one side member connected for rotational displacement with said brush system, a driving connection from the rotor output shaft to the other side member of said second differential, and transmission means between the other side member of said first differential and the center member of said second differential.

2. A power follow-up system according to claim 1, in which said transmission means consists of a mechanical wrap-up device capable of direct transmission of motion or of recording override for effective transmission at a latter time.

3. A power follow-up system comprising an electric motor having a stator field winding, a stationary commutator of which the segments are consecutively connected to consecutive tappings of said field winding, a brush system for co-operation with said commutator, a plurality of brushes in said brush system, a rotor formed as an inductor rotor, and comprising an output shaft driven by said rotor, a mechanical connection from the output shaft to said brush system to rotate the latter in unison with the rotor, a source of electrical supply, electrical connections from said source to said brush system to produce a configuration of the magnetic field developed by said stator which configuration rotates in unison with the rotor, a sensitive input shaft, a differential gear having a first element connected to said input shaft, a connection between the output shaft and the second element of said differential gear to impart movements to said second element according to the movements of the output shaft, means for causing rotative displacements of the configuration of said magnetic field with respect to the rotor according to the amount of the displacement of the output shaft with respect to the input shaft, and a connection between said means and the third element of the differential gear.

4. A power follow-up system comprising an electric motor having a stator field winding, a stationary commutator of which the segments are consecutively connected to consecutive tappings of said field winding, a brush system for co-operation with said commutator, at least three brushes in said brush system, a rotor formed as an inductor rotor, and comprising an output shaft driven by said rotor, a mechanical connection from the output shaft to said brush system to rotate the latter in unison with the rotor, a source of electrical supply, electrical connections from said source to said brush system to produce a configuration of the magnetic field developed by said stator which configuration rotates in unison with the rotor, a sensitive input shaft, a differential gear having a first element connected to said input shaft, a connection between the output shaft and the second element of said differential gear to impart movements to said second element according to the movements of the output shaft, electrical switching means in the electrical connections from said source to said brush system, said electrical switching means having a number of operative positions so that the polarity of the brushes of the brush system can be varied, thereby to cause variation of the configuration of said magnetic field with respect to the rotor, a movable member in said electrical switching means for determining the operative position assumed, a connection between said movable member and the third element of the differential gear, such last mentioned connection ensuring that the rotative displacements of the configuration of the magnetic field with respect to the rotor are according to the amount of the displacement of the output shaft with respect to the input shaft.

5. A power follow-up system comprising a first system according to claim 4 and a second system also according to claim 4, a torque amplifier motor including a motor output shaft and a displaceable brush system for determining output torque, a driving connection between the motor output shaft of said torque amplifier and the sensitive input shaft of said second system, a driving connection between the second element of the differential gear of the first system and the second element of a differential gear of the second system, an output differential gear with one side member connected to the output shaft of said first system, and a connection between the output shaft of said second system and the centre member of said output differential gear, transmission means between the brush system of said torque amplifier and the other side member of said output differential gear, means for limiting the angular displacement of the brush system of the torque amplifier with respect to the output shaft of the torque amplifier, and a slipping clutch in said transmission means for permitting slipping as between the said other side member of the output differential gear and the brush system of said torque amplifier when the angular displacement of the brush system with respect to the output shaft of the torque amplifier has become limited.

6. A power follow-up system according to claim 3, in which the connection between said means and the third element of the differential gear includes a mechanical wrap-up device capable of direct transmission of motion or of recording override for effective transmission at a later time.

7. A power follow-up system comprising a first system according to claim 3 and a second system also according to claim 3, a torque amplifier motor having a displaceable brush system for determining output torque and an output shaft, a driving connection between the output shaft of said torque amplifier and the sensitive input shaft of said second system, a driving connection between the output shaft of the motor of said first system and the center member of differential gear of said second system, an output differential gear with one side member connected to the output shaft of said first system, and a connection between the output shaft of said second system and the center member of said output differential gear, and transmission means between the brush control of said torque amplifier and the other side member of said output differential gear.

8. A system according to claim 7, in which the torque amplifier has mechanism for limiting the speed of its output shaft to the speed of movement of its brush system, and in which said transmission means includes a slipping clutch.

JOHN PERCIVAL WATSON.

REFERENCES CITED

The following references are of record in the file of this patent:

UNITED STATES PATENTS

| Number | Name | Date |
| --- | --- | --- |
| 592,244 | Fay | Oct. 26, 1897 |
| 1,068,759 | Girardelli | July 29, 1913 |
| 1,583,439 | Barr et al. | May 4, 1926 |
| 1,684,315 | Haller | Sept. 11, 1928 |
| 2,170,623 | Watson | Aug. 22, 1939 |